(12) United States Patent
Koh

(10) Patent No.: US 6,922,941 B2
(45) Date of Patent: Aug. 2, 2005

(54) METHOD FOR MAKING A PLANT-CULTIVATING WEB FROM EXCRETIVE SLUDGE OF DOMESTIC ANIMALS

(75) Inventor: Meeng-Ter Koh, Tainan (TW)

(73) Assignee: Taiwan Livestock Research Institute, Council of Agriculture, Tainan (TW)

( * ) Notice: Subject to any disclaimer, the term of this patent is extended or adjusted under 35 U.S.C. 154(b) by 138 days.

(21) Appl. No.: 10/421,746

(22) Filed: Apr. 24, 2003

(65) Prior Publication Data

US 2005/0034366 A1 Feb. 17, 2005

(51) Int. Cl.[7] .......................... A01G 13/02; C09K 17/52
(52) U.S. Cl. .................................. 47/9; 71/12; 264/122
(58) Field of Search .......................... 47/9, 58.1 R, 56, 47/32; 71/12; 264/122

(56) References Cited

U.S. PATENT DOCUMENTS

| | | | | |
|---|---|---|---|---|
| 3,907,726 A | * | 9/1975 | Tomiyama | 523/128 |
| 4,180,459 A | * | 12/1979 | Zievers | 71/12 |
| 4,986,026 A | * | 1/1991 | Decker | 47/56 |
| RE33,998 E | * | 7/1992 | Hampton | 71/12 |
| 5,177,898 A | * | 1/1993 | Decker | 47/56 |
| 5,279,637 A | * | 1/1994 | Lynam et al. | 71/12 |
| 5,481,827 A | * | 1/1996 | Decker | 47/58.1 R |
| 2003/0022959 A1 | * | 1/2003 | Blount | 523/129 |

FOREIGN PATENT DOCUMENTS

JP    11289862 A  * 10/1999  ............ A01G/1/00

* cited by examiner

*Primary Examiner*—Jeffrey L. Gellner
(74) *Attorney, Agent, or Firm*—Rosenberg, Klein & Lee

(57) ABSTRACT

A method for making a plant-cultivating web or sheet from excretive sludge of domestic animals includes collecting sludge; concentrating the sludge; stabilizing the sludge; dehydrating the sludge; mixing the sludge with polyvinyl acetate (PVAC), wherein the mixing ratio between the sludge and PVAC is 4:1; drying a mixture of the sludge and PVAC; grinding the dried mixture into powders; mixing the powders with polyethylene, wherein the mixing ratio between the powders and polyethylene is 10%–80%: 90%–10%; adding high molecular weight starch into a mixture of the powders and polyethylene; and rolling the starch/mixture of the powders and polyethylene into a plate-cultivating web. An environment-protective and waste-reusing product is provided accordingly.

4 Claims, 1 Drawing Sheet

METHOD FOR MAKING A PLANT-CULTIVATING WEB FROM EXCRETIVE SLUDGE OF DOMESTIC ANIMALS

BACKGROUND OF THE INVENTION

1. Field of the Invention

The present invention relates to a method for making a plant-cultivating web from excretive sludge of domestic animals.

2. Description of the Related Art

Livestock industry still plays a role in modern world and pig raising is a role of livestock industry. Nevertheless, pig raising causes pollution and is thus detrimental to the environment and adversely affects the relations and interactions between organisms and their environment. The excretive waste of pigs that must be processed at first priority is sludge, including primary sludge, anaerobic sludge, and activated sludge. The sludge comprises soluble and insoluble solids, suspended fixed and microorganisms, and undecomposed pig feces is the main problem. An adult pig excretes dry sludge in the amount of 0.01 kg per day, and the accumulative volume for the whole pig-raising site is very large. A conventional solution for the sludge is circulating a part of the sludge and cleaning the rest of the sludge, yet the circulating part of the sludge still requires treatment. The pig feces contain organic wasted water of high concentration, and the sludge contains organisms full of nitrogen and phosphorus.

A farmer cultivating plants often uses a plastic web for preventing the plants from being damaged by cold weather and for avoiding rapid evaporation of water from the plants. However, the plastic web is made of waterproof material and thus could not decompose when discarded, which is detrimental to the environment. Air pollution is caused when the plastic web is burned.

The present invention is intended to provide a method for solving above problems and efficiently using the waste of pig raising.

SUMMARY OF THE INVENTION

An object of the present invention is to provide a method for making a plant-cultivating web from excretive sludge of domestic animals.

A method for making a plant-cultivating web from excretive sludge of domestic animals includes collecting sludge; concentrating the sludge; stabilizing the sludge; dehydrating the sludge; mixing the sludge with polyvinyl acetate (PVAC), wherein the mixing ratio between the sludge and PVAC is 4:1; drying a mixture of the sludge and PVAC; grinding the dried mixture into powders; mixing the powders with polyethylene, wherein the mixing ratio between the powders and polyethylene is 10%–80%: 90%–10%; adding high molecular weight starch into a mixture of the powders and polyethylene; and rolling the starch/mixture of the powders and polyethylene into a plate-cultivating web. An environment-protective and waste-reusing product is provided accordingly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
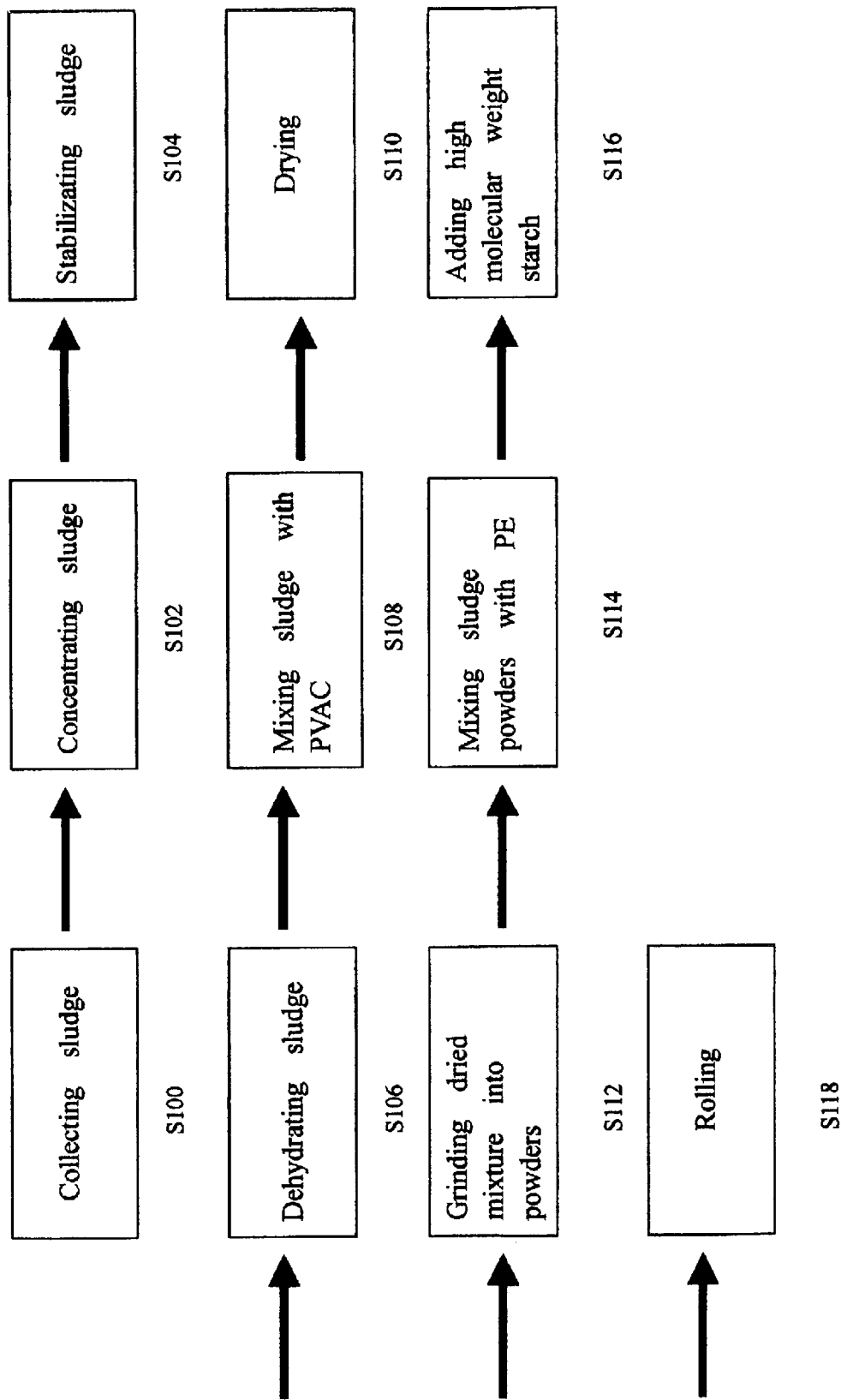
FIG. 1 is a flow chart illustrating a method for making a plant-cultivating web from excretive waste of domestic animals in accordance with the present invention.

Referring to FIG. 1, a method in accordance with the present invention is provided for making a plant-cultivating web from excretive waste of domestic animals. The term "excretive waste" used herein means the feces and urine of pigs (or other domestic animals) combined with water or any substances in the pig-raising site. The term "sludge" or "excretive sludge" means the solid portion of the excretive waste. The method in accordance with the present invention includes a first step of collecting sludge. The sludge in an excretive waste handling plant is generally sunk in a deposit tank (not shown) and an anaerobic tank (not shown) and must be collected into a sludge-concentrating tank (not shown) (Step 100). A motor (not shown) is used to convey the sludge to the sludge-concentrating tank (not shown) via plastic pipes (not shown).

The sludge-concentrating tank includes a conic bottom. After the sludge deposits, the supernatant is circulated back to an adjusting tank (not shown) or water tank (not shown). The concentration of the sludge is increased by at least 3% under the gravitational deposition (Step 102). The water content is reduced to thereby reduce the volume.

Mounted in a storage tank (not shown) for the concentrated sludge is an aerobic instrument (not shown). The remaining gas of the activated sludge after treatment by the aerobic instrument is directly inputted into the storage tank and then processed by an aerobic treatment for speeding the stabilization of the sludge (Step 104). It is found in tests that the unpleasant odor vanishes to a certain extent after four days of aerobic treatment.

Next, the sludge is dehydrated by, e.g., a belt filter (not shown) (Step 106). High molecular weight polymers are added to condense the sludge for facilitating the dehydration. The water is drained by gravity after dehydration by the belt filter.

Next, the sludge is mixed with polyvinyl acetate (PVAC), wherein the mixing ratio between the sludge and PVAC is 4:1 (Step 108). The mixture of sludge and PVAC is placed on a bed for drying by, e.g., sunlight (Step 110). The mixture of sludge and PVAC is dried to an extent (e.g., the mixture contains 5%–10% of water) suitable for grinding. Next, the dried mixture of sludge and PVAC is ground by a grinder (not shown) into powders ("sludge powders") (Step 112).

The dry sludge powders are then mixed with polyethylene (PE), wherein the mixing ratio between the sludge powders and polyethylene is 10%–80%: 90%–20% (preferably 40%–60%: 60%–40%) (Step 114). Next, high molecular weight starch (such as potato or corn) is added into the mixture of sludge powders and PE (Step 116). The starch/mixture of sludge powders and PE is then rolled by a rolling machine to form a plant-cultivating web (Step 118).

The plant-cultivating web contains dehydrated sludge, plastic material with low density, and decomposable starch. Therefore, the plant-cultivating web decomposes after it is implanted into the soil. No further treatment or handling of the plant-cultivating web is required. Further, the decomposed plant-cultivating web nourishes the soil, which is environmentally friendly. An environment-protective and waste-reusing product is provided accordingly.

Although the invention has been explained in relation to its preferred embodiment, it is to be understood that many other possible modifications and variations can be made without departing from the scope of the invention as hereinafter claimed.

What is claimed is:

1. A method for making a plant-cultivating web from excretive sludge of domestic animals, the method comprising:

collecting sludge;

concentrating the sludge;

stabilizing the sludge;

dehydrating the sludge;

mixing the sludge with polyvinyl acetate, wherein the mixing ratio between the sludge and polyvinyl acetate is 4:1;

drying a mixture of the sludge and polyvinyl acetate;

grinding the dried mixture into powders;

mixing the powders with polyethylene, wherein the mixing ratio between the powders and the polyethylene is 10%–80% or 90%–10%;

adding starch into a mixture of the powders and polyethylene; and rolling the starch/mixture of the powders and polyethylene into a plate-cultivating web.

2. The method as claimed in claim 1, wherein the mixing ratio between the powders and the polyethylene is 40%–60% or 60%–40%.

3. The method as claimed in claim 1, wherein the starch is from potato.

4. The method as claimed in claim 1, wherein the starch is from corn.

* * * * *